Patented May 18, 1937

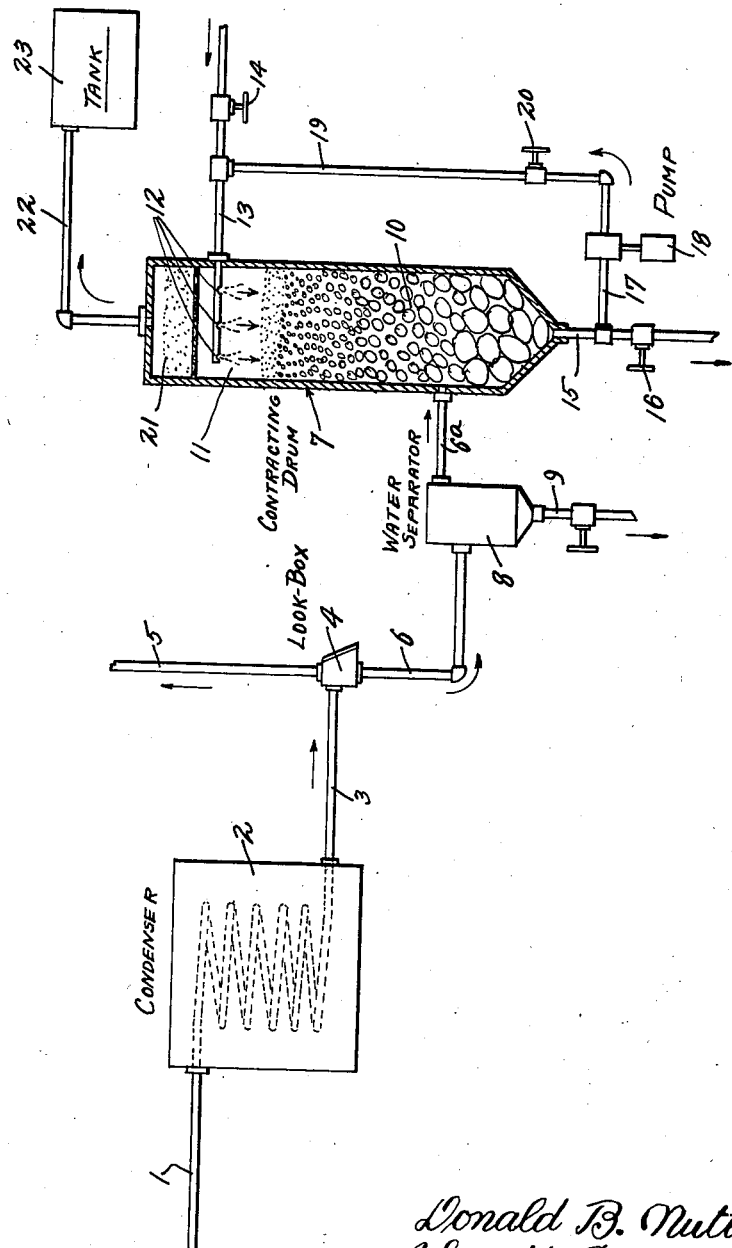

2,080,737

UNITED STATES PATENT OFFICE 2,080,737

ART OF TREATING PETROLEUM DISTILLATES WITH ALKALINE SOLUTIONS AND APPARATUS THEREFOR

Donald B. Nutt, El Segundo, and John H. Easthagen, Los Angeles, Calif., assignors to Standard Oil Company of California, San Francisco, Calif., a corporation of Delaware Application October 28, 1932, Serial No. 639,946

9 Claims. (Cl. 196—32)

This invention relates to the treatment of oils with aqueous treating solutions and has particular reference to an improved method and apparatus for treating petroleum distillates with aqueous alkaline solutions for the purpose of removing or neutralizing sulfur-containing bodies or gases such as hydrogen sulfide, acidic constituents and other impurities. Generally stated, one of the most important objects of the invention is to provide a method whereby alkaline solutions may be adequately and efficiently brought into intimate contact with petroleum distillates without incurring the disadvantages resulting from the formation of emulsions.

A great many of the crude mineral oils produced at the present time contain considerable quantities of sulfur and when such oils are distilled, more or less hydrogen sulfide is released and flows through the condensers and run-down lines along with the oil distillates produced. A portion of this hydrogen sulfide is carried in solution in the distillate, a portion is present in gaseous form mixed with the uncondensed hydrocarbon gases, and a further portion is present in solution in the stream water. In addition to hydrogen sulfide, the distillates are often contaminated with other sulfur-bearing and acidic bodies. Such hydrogen sulfide and other impurities, whether in solution in gasoline or water or in the gaseous state, are highly objectionable because of their corrosive properties and instability. From about 10 to more than 100 milligrams of hydrogen sulfide per liter may be present in these distillates, 30 to 60 milligrams being the usual quantity found in distillates from Southern California oils.

In order to remove these objectionable bodies, it has long been the practice to introduce alkaline materials into the distilled oils, such introduction being made either to the oil in the stills, into the vapors, or into the oil in the condensers or in the run-down lines or into two or more of these places. The prior methods of contacting or treating petroleum distillates with alkaline solutions have not been entirely satisfactory for a number of reasons.

To be efficient the alkaline treatment should consist of intimate and repeated contacts of the aqueous alkaline solution with the oil in such a manner that hydrogen sulfide and other acidic compounds may be reacted upon, and substantially complete utilization of the alkali may be obtained without losses due to aqueous alkaline emulsions.

Heretofore a common practice has been to introduce caustic soda solutions at a point near the outlet of the condensers, allowing such solution to flow with the oil condensate through the run-down lines into the collecting or "pan" tanks. The natural turbulence in such lines provides a certain amount of contact between the caustic and the dissolved and undissolved hydrogen sulfide and other sulfur-containing and acidic impurities. For several reasons this simple method has not been entirely satisfactory. In the first place, the amount and type of contacting between the caustic solution and the hydrogen sulfide is inadequate to provide for thorough hydrogen sulfide removal unless excessive quantities of the alkaline material are used. This particular difficulty can be partly overcome by introducing the caustic into the oil line through an atomizing spray but although the contact is improved momentarily, the oil, caustic and gas phases separate rapidly as soon as the spray is passed. Baffles have been occasionally introduced into these lines so as to improve turbulence but this expedient does not entirely answer the requirements. The problems and difficulties herein referred to arise in the treatment of straight distillates and cracked distillates which contain appreciable quantities of hydrogen sulfide, say more than about 10 milligrams of hydrogen sulfide per liter. These problems do not arise in the treatment of previously acid treated oils, as acid treatment results in the formation of free sulfur and acid treated distillates do not contain hydrogen sulfide.

In such prior methods, the efficiency obtainable is limited by the fact that the treatment employs concurrent flow of petroleum distillate and aqueous alkaline or caustic solution. Counter flow mixing is more efficient and attempts have been made to employ countercurrent treatment by installing a vertical drum in the run-down line between the condenser and the collecting tanks. This drum may be equipped with baffles for breaking up and mixing the oil, gas and caustic solution flowing therethrough. Generally, the oil and gases from the condenser enter the bottom of the drum and emerge from the top, whereas the caustic solution is introduced near the top and is drawn off from the bottom.

In actual practice even this countercurrent method of contacting is unsatisfactory. If the caustic is introduced into the drum through an open pipe, emulsion formation is minimized but the contacting is inadequate and the alkalinity of the caustic solution is not effectively utilized; if the caustic is fed into the drum through sprays which give adequate atomization for good contacting, there is a tendency to form relatively stable emulsions with resultant loss of both alkaline material and oil.

In general it has been found that regardless of what particular method of contacting the caustic solution with the oil and gas is used, the better the contacting—the greater the difficulty with emulsions.

We have discovered that the disadvantages and difficulties of prior methods of treating petroleum distillates (containing more than about 10 milligrams of hydrogen sulfide per liter) with aqueous alkaline solutions can be avoided, that is, that adequate and effective contact of the treating solution with the distillate can be secured with minimum loss of oil and reagent by thoroughly contacting the distillate and alkaline solution, then passing the mixture through a porous bed of solid insoluble material. The passage of such mixture through the voids or interstices of a bed of this character will break any emulsion that might have been formed during the prior contacting step, and will agglomerate small particles of reagent carried in suspension in the oil. Furthermore, by passing such mixture upwardly through the bed, additional contacting is secured, the oil discharged from the upper portion of the bed is substantially free from suspended particles and/or emulsified treating solution while the spent caustic is discharged from the bottom portion of the bed.

In addition, it has been discovered that a most effective form of treatment of the nature stated is attained by initially contacting the oil with the aqueous alkaline solution in a similar porous bed of solid insoluble material, such contacting being then followed by the passage of the mixture through an additional bed such as that first described hereinabove.

It is an object of this invention, therefore, to disclose and provide a method and an apparatus for rapidly, continuously and efficiently treating petroleum distillates, particularly distillates containing hydrogen sulfide and acidic impurities, with an aqueous alkaline solution.

Another object is to disclose and provide a method and apparatus for treating petroleum distillates with aqueous alkaline solutions such that the finished oil discharged from the process will contain substantially no emulsified materials.

A further object is to disclose and provide a method and apparatus for the treatment of distillates, which method and apparatus is applicable to the run-down lines of stills and which offers a minimum of resistance to the gravitational flow of the oil in the said run-down lines.

A still further object of the invention is to disclose and provide a method for treating petroleum distillates for the removal of sulfur compounds and other impurities therefrom, in which the treating agent is utilized to a maximum extent with a minimum requirement for the use of extraneous power.

Another object is to provide a method and apparatus for the treatment of petroleum distillates containing appreciable quantities of hydrogen sulfide, with a liquid reagent which tends to emulsify and remain suspended in the oil, whereby the most thorough contacting of the two liquids may be employed while substantial loss of either oil or reagent is prevented.

These and other objects, uses and advantages of the invention will become apparent to those skilled in the art from the following detailed description of the method as carried out in an illustrative form of apparatus. In describing the invention, reference will be had to the appended drawing diagrammatically illustrating one satisfactory arrangement of elements.

As indicated in the drawing, the oil vapors from a still, not shown, may flow by means of line 1 through a suitable water-cooled condenser coil 2. The condensate formed in 2 flows thence through line 3 into a "look-box" 4 or other means adapted to permit visual inspection of the stream coming from the still. Ordinarily, provision is made at the look-box for venting uncondensed gases and vapors. Such a vent line is shown in the drawing at 5. This line 5 is either open to the atmosphere or more often is connected to a vapor recovery system, not shown in the drawing. From the look-box the condensate is discharged by line 6 and is conveyed to a contacting drum 7. When the vent 5 is used, the material flowing through the line 6 normally contains only a relatively small portion of uncondensed gases. In practice the condensates usually contain a material quantity of water derived from water originally present in the crude from which the oil is distilled, or resulting from the use of steam in the still. In such cases it is advantageous to insert in the line 6 a water separator 8. Such a separator may consist of nothing more than an open drum which retards the velocity of flow and permits the water to separate out by gravity. The water thus separated from the oil is withdrawn, either continuously or periodically, through a valved outlet 9. The substantially water-free oil then continues through line 6a into the lower portion of the contacting drum 7.

The drum 7 contains a porous bed of solid insoluble material (preferably insoluble in both the oil and in the aqueous alkaline treating solution), said bed being preferably provided with voids or interstices of gradually decreasing size in an upward direction. Such voids or interstices existing in the bed, generally indicated at 10, are sufficiently large and sufficiently numerous, however, so as to permit the passage of fluid without setting up any substantial resistance to flow and therefore without causing any objectionable back pressure.

A specific example of a porous bed suitable for use in carrying out the method of this invention is the following:

The lower part of the drum 7 in the region at which the line 6a enters, may be packed with relatively coarse rock, for example, the rock known to the trade as No. 1 and/or No. 2 rock. No. 1 rock generally contains pieces or particles of from about 1½ to 3 inches in diameter, whereas No. 2 rock is composed of particles ¾ to 1½ inches in diameter. This layer of relatively coarse rock serves primarily to support the layers of finer rock placed above it. Above the coarse rock is a relatively deep bed of No. 3 rock (¼ to about ¾ inch in diameter) and above this may be placed a relatively shallow bed of still finer rock, for example, a No. 4 rock (containing particles from about ⅛ to ¼ inch in diameter).

This graded bed of material does not extend to the top of the drum 7 but instead terminates at some point spaced from the top so as to leave a free or unobstructed space, indicated at 11. The alkaline treating solution is introduced into the system in such free space 11 as by means of sprays 12 supplied with the caustic solution by line 13 from a storage or make-up tank, not shown, said line 13 being provided with valve 14.

The nozzles 12 are preferably so distributed and placed with respect to the top of the rock bed 10 that substantially the entire cross section of the drum 7 is covered by caustic spray.

The bottom of the treating drum 7 is provided with an outlet line 15 through which the spent alkaline solution may be discharged. The line 15 may be provided with a valve 16. Means may be provided whereby the alkaline solution may be recirculated through the treating drum 7. Such recirculating means may include a by-pass line 17 leading from the discharge line 15 to a pump 18 and a return line 19 leading from the discharge side of pump 18 to the spray line 13. Said line 19 may be provided with a valve 20.

Above the free space 11 of the treating drum 7 and held by a suitable grille is a layer or bed of relatively fine porosity, such as, for example, a bed 21 of No. 4 rock. The top of the treating drum 7 may then be provided with a discharge line 22 for treated petroleum distillate, such discharge line 22 leading to a collecting or pan tank 23.

The operation of the apparatus described hereinabove will be readily apparent to those skilled in the art. The vapors and gases from the still pass through the condenser 2 wherein the desired hydrocarbons are reduced to liquid form. Uncondensed gas is discharged through the vent line 5. Condensed water present in the condensate is separately discharged from the run-down line 6 by means of the water separator 8. The withdrawal of water at this point removes a certain amount of hydrogen sulfide from the system and furthermore prevents dilution of the caustic used in the treating drum 7.

The gases and liquids rising through the rock packing of the treating drum 7 meet and mingle with the caustic solution which is flowing downwardly therethrough, such caustic solution being introduced by means of the sprays 12 supplied with caustic by line 13. Obviously the velocity of the upwardly flowing petroleum distillate through the bed 10 of the treating drum 7 is relatively high, whereas in the free space 11 the upward velocity of the body of distillate is relatively low. By reason of the tortuous path through which the upwardly flowing petroleum distillate and downwardly flowing aqueous alkaline solution pass in the bed 10, the distillate (and any still gas present) is thoroughly contacted or scrubbed and the hydrogen sulfide and other acidic compounds contained therein are converted to their sodium salts which are retained in the aqueous solution and carried to the bottom of the drum. As the distillate and gases ascend through the bed 10, they contact with fresher caustic solution and finally when they reach the free space 11, they ascend through a shower of finely divided caustic solution.

The distillate which passes upwardly beyond the caustic spray nozzles 12, carries with it a small but important quantity of finely divided caustic in suspension and emulsion with the oil. As such suspended and/or emulsified droplets of caustic pass upwardly through the bed 21, they are coagulated, thus allowing the substantially clear petroleum distillate, practically free from aqueous alkaline solution and/or reaction products, to be discharged by the line 22 into the receiving tank 23. The major portion of the caustic solution that reaches the upper bed is discharged from the bottom of this bed and returned to the lower bed for utilization. However, any caustic solution which may be carried off by the petroleum distillate through line 22 is in the form of very coarse and agglomerated or coalesced droplets which readily separate from the body of petroleum distillate in the tank 23.

The spent caustic solution, together with the reaction products, may be continuously withdrawn through line 15 and valve 16. The removal of this used caustic may be controlled by an automatic level regulating valve of any well known design. In practice it has been found advantageous to continuously recirculate the bulk of the caustic withdrawn from the base of the drum through line 13, this recirculation being accomplished by means of lines 17 and 19 and pump 18. Since the operation is continuous, the alkalinity of the caustic solution is prevented from falling below a predetermined value by supplying fresh caustic from time to time through the valve 14, at the same time preventing an overloading of the system by withdrawing the necessary amount of spent caustic through valve 16. In this manner, equilibrium conditions are established and maintained indefinitely.

The above described illustrative example of the process and apparatus has been found to be particularly satisfactory when treating a gasoline distillate derived from California high sulfur crude. One particular contacting drum used on such California distillate was a vertical cylinder 8 feet in diameter and 13 feet high. The contents of this drum, from bottom to top, consisted of a 10 inch bed of No. 1 rock, a 10 inch bed of No. 2 rock, a 7.3 foot bed of No. 3 rock, and a 1 foot bed of No. 4 rock. This constituted the graded porous bed 10 of the drawing. Above this bed was a 16 inch free space in which the sprays were positioned and above said free space was an 8 inch bed of No. 4 rock. The total pressure drop through this drum, packed as described, was approximately one pound per square inch for a gasoline distillate rate of 200 barrels per hour.

In the method of operation described hereinabove, the bed 10 was used for contacting whereas the bed 21 functioned primarily as a means of eliminating the emulsions formed by the sprays 12. It is to be understood that any method of contacting may be employed instead of the rock bed 10, provided such contacting is followed by a passage of the distillate and alkaline solution (or alkaline solution emulsified or entrained therein) through a finely porous bed of solid insoluble material such as the bed 21. Those skilled in the art will appreciate that it is not necessary that the bed 21 be placed immediately above the caustic sprays nor even within the drum 7. Such bed 21 may be placed wherever most convenient provided it is between the point of contact with the alkaline solution and the receiving or collecting tank 23. It is not essential that the oil flow upwardly through bed 21. The function to be performed thereby, namely, the repeated impingement and contacting of oil and contained alkali and reaction products with the rock surfaces, can be effected by horizontal or downward flow (if desired. Moreover, it is not necessary that the beds 10 and 21 be made of rock. Various other materials such as coke, ashes, etc., may be used provided they are adapted to perform the same function as the rock described, that is, to cause the oil to be finely subdivided and flow through a multiplicity of small tortuous passages, or interstices, thus providing intimate and repeated contact with solid surfaces.

Since carry-over of alkaline agent, whether as emulsified or as difficulty removable suspended particles, results in a loss of usable agent, the use of the herein described method and apparatus increases the overall efficiency of the agent, i. e., makes possible the treatment of a larger quantity of oil per unit quantity of agent.

It is to be understood that the method of the present invention is applicable not only to gasoline distillates but to other petroleum distillates as well, such as naphthas and lamp oils or even to heavier oils.

Although a particular arrangement of apparatus has been described in detail and one preferred method of carrying out the process of the invention has been described, it is to be understood that numerous changes and modifications may be used without departing from the spirit of the invention.

All such changes and modifications as come within the scope of the appended claims are embraced thereby.

We claim:

1. In the art of treating petroleum distillates containing a substantial amount of hydrogen sulfide with aqueous alkaline solutions, the steps of contacting such petroleum distillate with an alkaline solution in a porous contact bed of insoluble material by passing petroleum distillate upwardly through the interstices of said bed at a relatively high velocity while simultaneously passing alkaline solution downwardly through said bed, and then passing the petroleum distillate and a portion of the alkaline solution carried thereby through additional porous bed of solid insoluble material, whereby alkaline solution and reaction products are separated and petroleum distillate substantially free from hydrogen sulfide and alkaline solution is separately discharged from the top of said second bed.

2. In the art of treating petroleum distillates with aqueous alkaline solutions, the steps of contacting petroleum distillate containing a substantial amount of hydrogen sulfide with alkaline solution in a porous contact bed of insoluble material by passing such petroleum distillate upwardly through the interstices of such bed at a relatively high velocity while simultaneously passing alkaline solution downwardly through said bed, discharging petroleum distillate from the top of said bed into a free zone wherein the upward velocity of said distillate is materially reduced, introducing alkaline solution in the form of a spray into the upwardly rising body of distillate at a point in said free zone above said bed, and then passing the petroleum distillate and the alkaline solution carried thereby through a second porous bed of solid insoluble material above said first bed, whereby an alkaline solution and reaction products are separated and petroleum distillate substantially free from hydrogen sulfide from alkaline solution and reaction products is separately discharged from the top of said second bed.

3. A method of treating petroleum distillates containing uncondensed gases, hydrogen sulfide, acidic impurities and water, comprising separating the major portion of uncondensed gases from the petroleum distillate, separating and discharging water from said distillate, passing the distillate containing hydrogen sulfide and acidic impurities upwardly through a porous bed of solid insoluble material provided with interstices of gradually decreasing size but of a size insufficient to materially impede the flow of said distillate while simultaneously passing an aqueous alkaline solution downwardly through said bed, discharging alkaline solution from the bottom of said bed, reducing the velocity of said petroleum distillate and alkaline solution carried thereby discharged from the top of said bed to permit some settling to take place, passing said petroleum distillate and remaining alkaline solution carried thereby from said settling zone upwardly through a second porous bed of solid insoluble material whereby the alkaline solution is coalesced, and discharging petroleum distillates substantially free from hydrogen sulfide and alkaline solution from the top of said bed.

4. A method of treating petroleum distillates from a still, such distillates containing uncondensed gases, hydrogen sulfide, acidic impurities and water, comprising separating the major portion of uncondensed gases from the petroleum distillate, separating and discharging water from said distillate, passing the distillate containing hydrogen sulfide and acidic impurities upwardly through a porous bed of solid insoluble material provided with interstices of gradually decreasing size but of a size insufficient to materially impede the flow of said distillate while simultaneously passing an aqueous alkaline solution downwardly through said bed, discharging alkaline solution from the bottom of said bed, reducing the velocity of said petroleum distillate and alkaline solution carried thereby discharged from the top of said bed to permit some settling to take place, passing said petroleum distillate and alkaline solution carried thereby from said settling zone upwardly through a second porous bed of solid insoluble material whereby a coalescence of said alkaline solution carried thereby is effected, discharging petroleum distillates substantially free from hydrogen sulfide and emulsified alkaline solution from the top of said second bed, and passing separated alkaline solution from the bottom of said second bed downwardly through said first bed.

5. In the art of treating petroleum distillates containing a substantial amount of hydrogen sulfide, the steps of contacting such petroleum distillate with an aqueous alkaline solution in a porous bed of solid insoluble material by passing the distillate upwardly through said bed while simultaneously passing an aqueous alkaline solution downwardly through said bed, separating the major portion of the alkaline solution from the distillate and discharging alkaline solution from the bottom of said bed, then passing the petroleum distillate together with the remaining portion of the alkaline solution through a secondary porous bed of solid insoluble material unreactive with the alkaline solution and distillate, and separately discharging petroleum distillate substantially free from hydrogen sulfide and emulsified and finely divided suspended alkaline solution from one portion of the secondary bed, and separately discharging spent alkaline solution from another portion of said bed.

6. In the art of treating petroleum distillates containing a substantial amount of hydrogen sulfide, the steps of: contacting petroleum distillate containing a substantial amount of hydrogen sulfide, and which distillate has not been acid treated, with an aqueous alkaline solution; removing a major portion of the alkaline solution from said distillate; then passing the petroleum distillate together with a portion of the alkaline solution through a porous bed of solid insoluble material which is not reactive with the alkaline solution and distillate; separately discharging spent alkaline solution from one portion of the bed, and separately discharging petroleum distillate substantially free from hydrogen sulfide and emulsified and finely divided suspended alkaline solution from another portion of the bed.

7. In the art of treating petroleum distillates containing substantial amounts of hydrogen sulfide, the steps of: contacting a flowing stream of petroleum distillate containing substantial quantities of hydrogen sulfide with an alkaline solution in a porous contact bed of particles of solid insoluble material which is not reactive with alkaline solution and distillate, by passing said petroleum distillate upwardly through the interstices of said bed at a relatively high velocity while simultaneously passing alkaline solution downwardly through said bed; discharging petroleum distillate from the top of said bed into a free zone wherein the upward velocity of said distillate is materially reduced to permit some settling to take place; introducing alkaline solution in the form of a spray into the upwardly rising distillate in such free zone at a point above the top of said bed; discharging petroleum distillate substantially free from hydrogen sulfide but containing emulsified alkaline solution from a point above said point of introduction of alkaline solution; passing said distillate and emulsified alkaline solution through a secondary bed of solid insoluble material; discharging treated distillate substantially free from hydrogen sulfide and emulsified alkaline solution from said secondary bed; and separately discharging alkaline solution and reaction products from the bottom of said first bed.

8. In the run-down line of a petroleum distilling system including a condenser and a collecting tank: conduit means for permitting flow of petroleum distillate from said condenser to said collecting tank; means for contacting liquid petroleum distillate with alkaline solution positioned in said conduit at a point between said condenser and collecting tank, said contacting means including a pipe for supplying alkaline solution and a separate pipe for withdrawing the major portion of spent alkaline solution; and a porous bed of solid insoluble material which is not reactive with alkaline solutions and petroleum distillates positioned in said conduit between said contacting means and collecting tank, said porous bed being provided with interstices of a size insufficient to materially impede the flow of distillate therethrough, and means for discharging spent alkaline solution from one portion of said bed while said petroleum distillate is discharged into said conduit and collecting tank.

9. In the art of treating petroleum distillates containing a substantial amount of hydrogen sulfide, the steps of: contacting petroleum distillate containing a substantial amount of hydrogen sulfide with an aqueous alkaline solution; removing a major portion of the alkaline solution from said distillate; then passing the petroleum distillate together with a portion of the alkaline solution through a porous bed of solid insoluble material provided with interstices of a size insufficient to materially impede the flow of distillate therethrough, said solid material of said bed being not reactive with alkaline solution and distillate, separately discharging spent alkaline solution from one portion of said bed, and simultaneously but separately discharging petroleum distillate substantially free from hydrogen sulfide and emulsified and finely divided suspended alkaline solution from another portion of the bed.

DONALD B. NUTT.
JOHN H. EASTHAGEN.